(12) United States Patent
Laghate et al.

(10) Patent No.: US 12,150,106 B2
(45) Date of Patent: *Nov. 19, 2024

(54) SYSTEM AND METHOD FOR DETERMINATION OF A DYNAMIC BEAM LIST

(71) Applicant: QUALCOMM Incorporated, San Diego, CA (US)

(72) Inventors: Mihir Vijay Laghate, San Diego, CA (US); Raghu Narayan Challa, San Diego, CA (US); Jun Zhu, San Diego, CA (US); Mingming Cai, San Jose, CA (US); Yong Li, San Diego, CA (US); Ruhua He, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/050,034

(22) Filed: Oct. 26, 2022

(65) Prior Publication Data

US 2023/0075012 A1    Mar. 9, 2023

Related U.S. Application Data

(63) Continuation of application No. 16/775,213, filed on Jan. 28, 2020, now Pat. No. 11,523,394.

(Continued)

(51) Int. Cl.
*H04W 24/10*    (2009.01)
*H04W 8/08*    (2009.01)
(Continued)

(52) U.S. Cl.
CPC ........... *H04W 72/046* (2013.01); *H04W 8/08* (2013.01); *H04W 16/28* (2013.01); *H04W 24/10* (2013.01)

(58) Field of Classification Search
CPC ..... H04W 72/046; H04W 8/08; H04W 16/28; H04W 24/10; H04W 36/0085;
(Continued)

(56) References Cited

U.S. PATENT DOCUMENTS

2017/0303265 A1* 10/2017 Islam .................... H04W 72/23
2017/0311353 A1   10/2017 Liu et al.
(Continued)

FOREIGN PATENT DOCUMENTS

EP          3367588 A1    8/2018
WO       2018009516 A1    1/2018
(Continued)

OTHER PUBLICATIONS

International Preliminary Report On Patentability—PCT/US2020/030278, The International Bureau of WIPO—Geneva, Switzerland, Dec. 9, 2021.
(Continued)

*Primary Examiner* — Chuong A Ngo
(74) *Attorney, Agent, or Firm* — Arent Fox, LLP

(57) ABSTRACT

A UE may be configured to select narrower or wider beams that may be suitable for use with a current UE mobility, scattering environment, etc. The UE may track changes to an identified beam of a certain width, and so may recover from tracking or other radio link failures by switching to a beam that is spatially adjacent or to a beam of a different width. The UE may identify a first beam associated with a first beam width based on at least one reference signal received by the UE. The UE may further determine a set of beams based on the first beam width that is associated with the identified first beam, and the determined set of beams may include at least one beam corresponding to the first beam width. The UE may further measure respective channel qualities associated with each beam of the determined set of beams.

23 Claims, 9 Drawing Sheets

Related U.S. Application Data

(60) Provisional application No. 62/855,746, filed on May 31, 2019.

(51) Int. Cl.
 *H04W 16/28* (2009.01)
 *H04W 72/044* (2023.01)

(58) Field of Classification Search
 CPC ....... H04W 7/04; H04B 7/088; H04B 7/0626; H04L 5/0048; H03G 3/30
 See application file for complete search history.

(56) References Cited

U.S. PATENT DOCUMENTS

| | | |
|---|---|---|
| 2018/0062720 A1 | 3/2018 | Islam et al. |
| 2019/0044578 A1 | 2/2019 | Rao et al. |
| 2019/0068262 A1 | 2/2019 | Yu et al. |
| 2019/0150010 A1 | 5/2019 | Kwon et al. |
| 2019/0159054 A1 | 5/2019 | Yiu et al. |
| 2019/0215820 A1 | 7/2019 | Cirik et al. |
| 2019/0253128 A1 | 8/2019 | Moon et al. |
| 2020/0014454 A1 | 1/2020 | Guo et al. |
| 2020/0162980 A1 | 5/2020 | Kalkunte |
| 2020/0266870 A1* | 8/2020 | Yoon ................ H04B 17/318 |
| 2020/0274400 A1* | 8/2020 | Yeo ................... H02J 50/90 |
| 2020/0358498 A1* | 11/2020 | Mo ................... H04B 7/0482 |
| 2020/0383097 A1 | 12/2020 | Laghate et al. |

FOREIGN PATENT DOCUMENTS

| | | |
|---|---|---|
| WO | 2018056730 A1 | 3/2018 |
| WO | 2019066624 A1 | 4/2019 |

OTHER PUBLICATIONS

International Search Report and Written Opinion—PCT/US2020/030278—ISAEPO—Jul. 3, 2020.

* cited by examiner

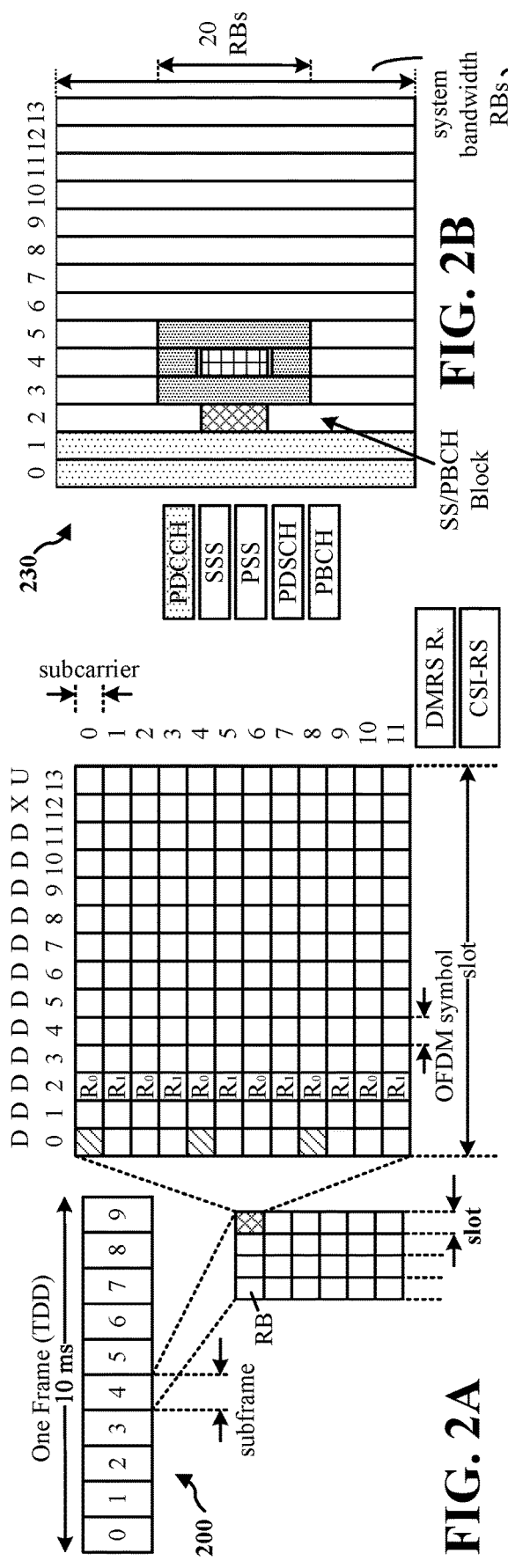
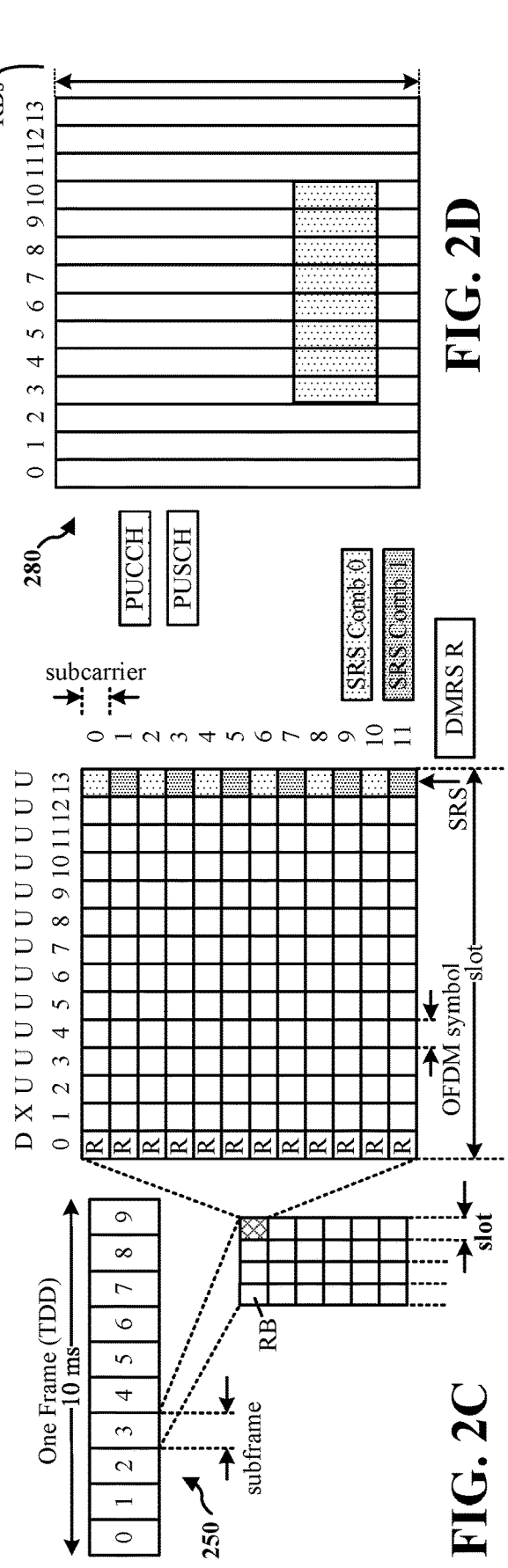

SYSTEM AND METHOD FOR DETERMINATION OF A DYNAMIC BEAM LIST

CROSS REFERENCE TO RELATED APPLICATION(S)

This application is a continuation of U.S. application Ser. No. 16/775,213, entitled "SYSTEM AND METHOD FOR DETERMINATION OF A DYNAMIC BEAM LIST" and filed on Jan. 28, 2020, which claims the benefit of U.S. Provisional Application Ser. No. 62/855,746, entitled "SYSTEM AND METHOD FOR A DYNAMIC BEAM LIST" and filed on May 31, 2019, the disclosures of which are expressly incorporated by reference herein in their entireties.

BACKGROUND

Technical Field

The present disclosure relates generally to communication systems, and more particularly, to a user equipment (UE) configured to determine a sets of beams corresponding to different beam widths.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

The present disclosure describes various techniques and solutions to identifying a set of beams of one or more widths, e.g., for beam tracking and measurements in different environments and/or different user equipment (UE) statuses. High propagation losses in millimeter-wave (mmW) and/or near-mmW communication environments may be addressed by the use of beamforming (e.g., for transmission and/or reception), the gain of which may improve upon omnidirectional communication. Higher beamforming gains may be achieved by using relatively narrower beams. However, relatively narrower beams may be more difficult to track during UE mobility and/or if the scattering environment changes. Consequently, the identification of a direction for a beam and tracking in that identified direction may be commensurate with UE mobility, diverse scattering environments, or other factors.

Therefore, a UE may benefit from techniques and solutions to identification of beams of certain widths when the UE is first configured to select narrower or wider beams than may be suitable for use with the current UE mobility, scattering environment, and so forth. In such an approach, the UE may track changes to the identified beam of the certain width based on mobility, and the UE may recover from tracking failures (e.g., when a radio link is lost) by moving to a beam that is spatially adjacent or to a wider beam that spatially encompasses the identified beam.

In an aspect of the disclosure, a method, a computer-readable medium, and an apparatus are provided. The apparatus may be implemented as a UE. In example one of the present disclosure, the apparatus is configured to: identify a first beam associated with a first beam width based on at least one reference signal received by the apparatus; determine a set of beams based on the first beam width that is associated with the identified first beam, the determined set of beams including at least one beam corresponding to the first beam width; and measure respective channel qualities associated with each beam of the determined set of beams.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

DETAILED DESCRIPTION

Figure 1:
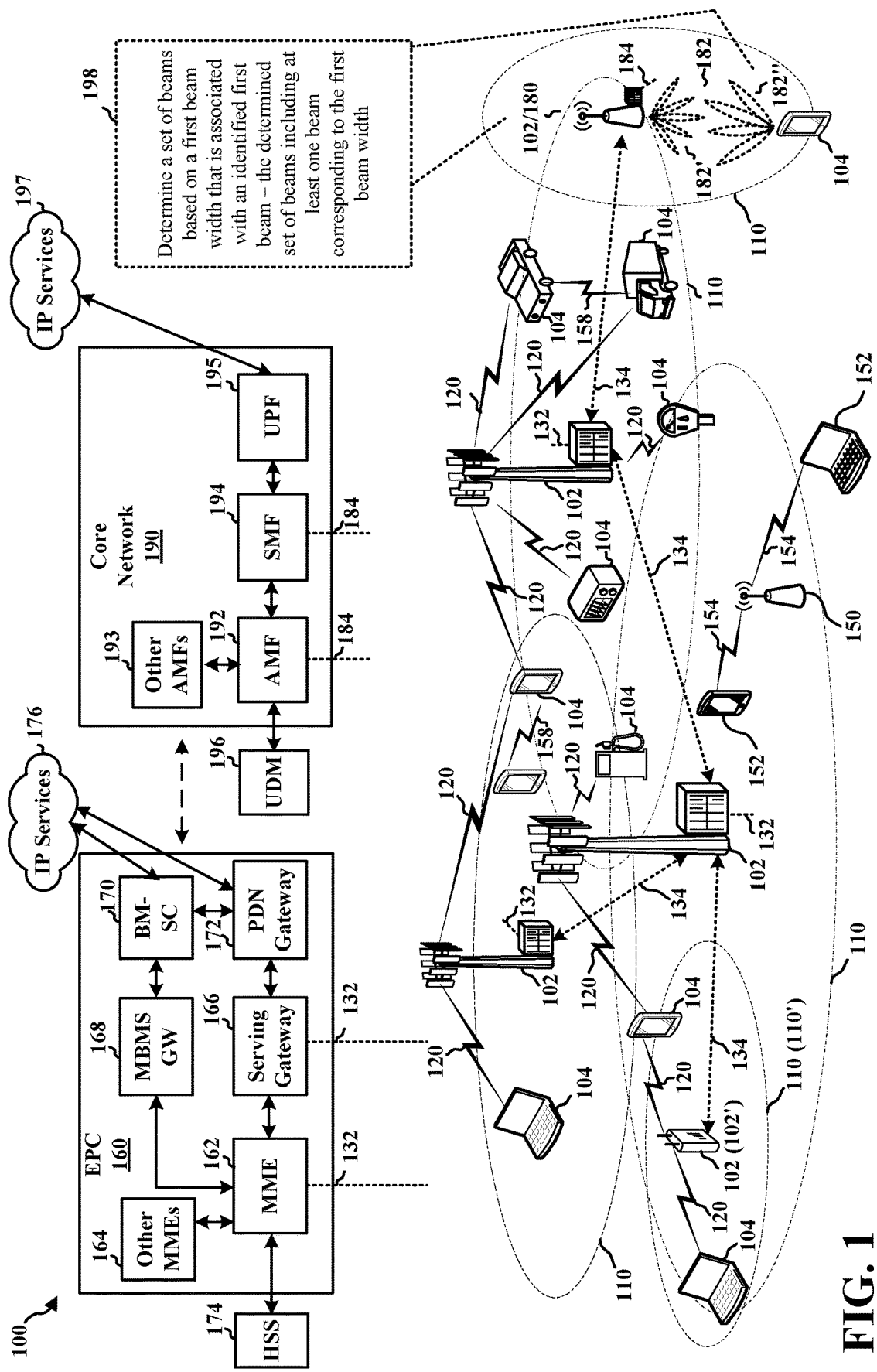
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, user equipment (UE) 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G Long Term Evolution (LTE) (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G New Radio (NR) (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/ actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Although the present disclosure may focus on 5G NR, the concepts and various aspects described herein may be applicable to other similar areas, such as LTE, LTE-Advanced (LTE-A), Code Division Multiple Access (CDMA), Global System for Mobile communications (GSM), or other wireless/radio access technologies.

Referring again to FIG. 1, in certain aspects, the UE 104 may be configured to identify a first beam associated with a first beam width based on at least one reference signal received by the UE 104 from the base station 102/180. The UE 104 may be configured to determine a set of beams based on the first beam width that is associated with the identified first beam (198). The determined set of beams may include at least one beam corresponding to the first beam width. The UE 104 may be further configured to measure respective channel qualities associated with each beam of the determined set of beams. The determined set of beams may be based on a lowermost allowable beam width, which may be a minimum or smallest beam width that will be accommodated for at least some beamformed communication.

In some aspects, the UE 104 may be further configured to determine whether to include, in the determined set of beams, beams corresponding to a second beam width or beams corresponding to a third beam width. The second beam width may be narrower than the first beam width, and the third beam width may be wider than the first beam width. The determination of whether to include, in the determined set of beams, the beams corresponding to the second beam width or the beams corresponding to the third beam width is based on a status of the UE 104. For example, the status of the UE 104 may be at least partially based on a mobility of the UE 104.

In some aspects, the first beam, identified by the UE 104 and associated with the first beam width, may spatially contain one or more beams corresponding to the second beam width. In some other aspects, the first beam, identified by the UE 104 and associated with the first beam width, may be spatially contained by at least one beam corresponding to the third beam width.

In some aspects, the UE 104 may determine the set of beams further based on a status of the UE 104, in addition to the first beam width associated with the identified first beam. The first beam may be a current serving beam on which the UE 104 communicates with the base station 102/180, e.g., utilizing beamforming 182 in one of the directions 182". The UE 104 may be further configured to switch the current serving beam from the first beam to a second beam that is included in the set of beams, e.g., such as by switching from one of the directions 182" to another of the directions 182" when utilizing beamforming 182. The UE 104 may switch the current serving beam based on the respective measured channel qualities associated with each beam of the determined set of beams. The UE 104 may be further configured to report the respective measured channel qualities to the base station 102/180 when the UE 104 is configured for measurement reporting.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies id 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu * 15$ kHz, where $\mu$ is the numerology 0 to 5. As such, the numerology 1.1=0 has a subcarrier spacing of 15 kHz and the numerology $\mu=5$ has a subcarrier spacing of 480 kHz. The symbol length/duration is inversely related to the subcarrier spacing. FIGS. 2A-2D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 µs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where $100x$ is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as a synchronization signal block or SSB). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
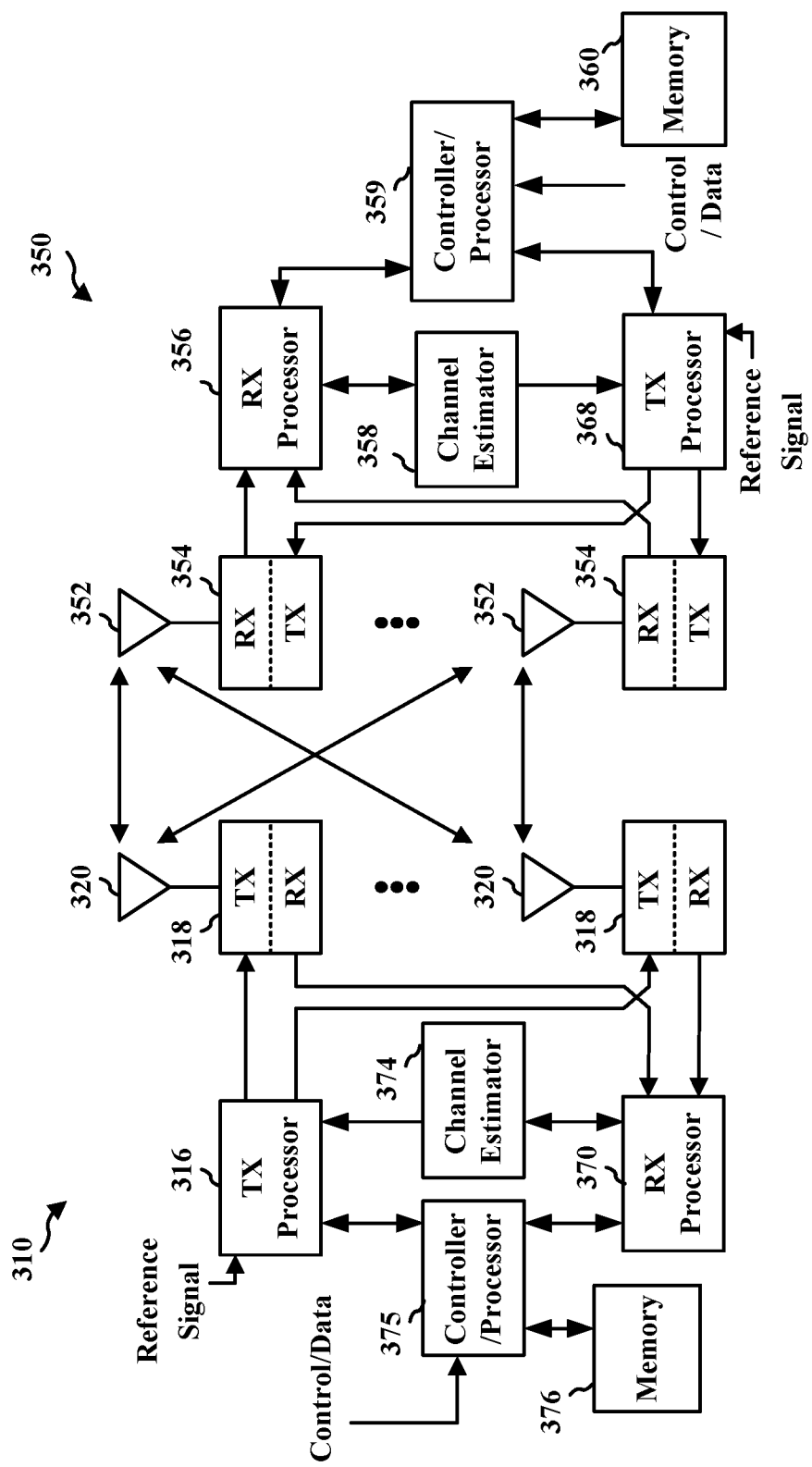
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

In some aspects, at least one of the TX processor 368, the RX processor 356, and the controller/processor 359 may be configured to perform aspects in connection with (198) of FIG. 1.

Referring to FIGS. 4 through 9, 4-7 illustrate an approach to identifying a set of beams of one or more widths, e.g., for beam tracking and measurements in different environments and/or different UE statuses. High propagation losses in mmW communication environments may be addressed by the use of beamforming (e.g., for transmission and/or reception), the gain of which may improve upon omnidirectional transmission. Higher beamforming gains may be achieved by using relatively narrower beams. However, relatively narrower beams may be more difficult to track during UE mobility and/or if the scattering environment changes. Consequently, the identification of a direction for a beam and tracking in that identified direction may be commensurate with UE mobility, diverse scattering environments, or other factors.

Therefore, a UE may benefit from techniques and solutions to the identification of beams of a certain widths when first configured to select a beam of another width that may or may not be suitable for communication with the current UE mobility, scattering environment, and/or other factors. As described herein, a UE may track changes to an identified beam of a certain width based on mobility and/or other factors. The UE may recover from tracking failures (e.g., when a radio link is lost) and/or reduced signal quality by switching to a beam that is spatially adjacent or a wider beam that spatially encompasses the identified beam, which may improve beamformed communication by the UE.

Figure 4:
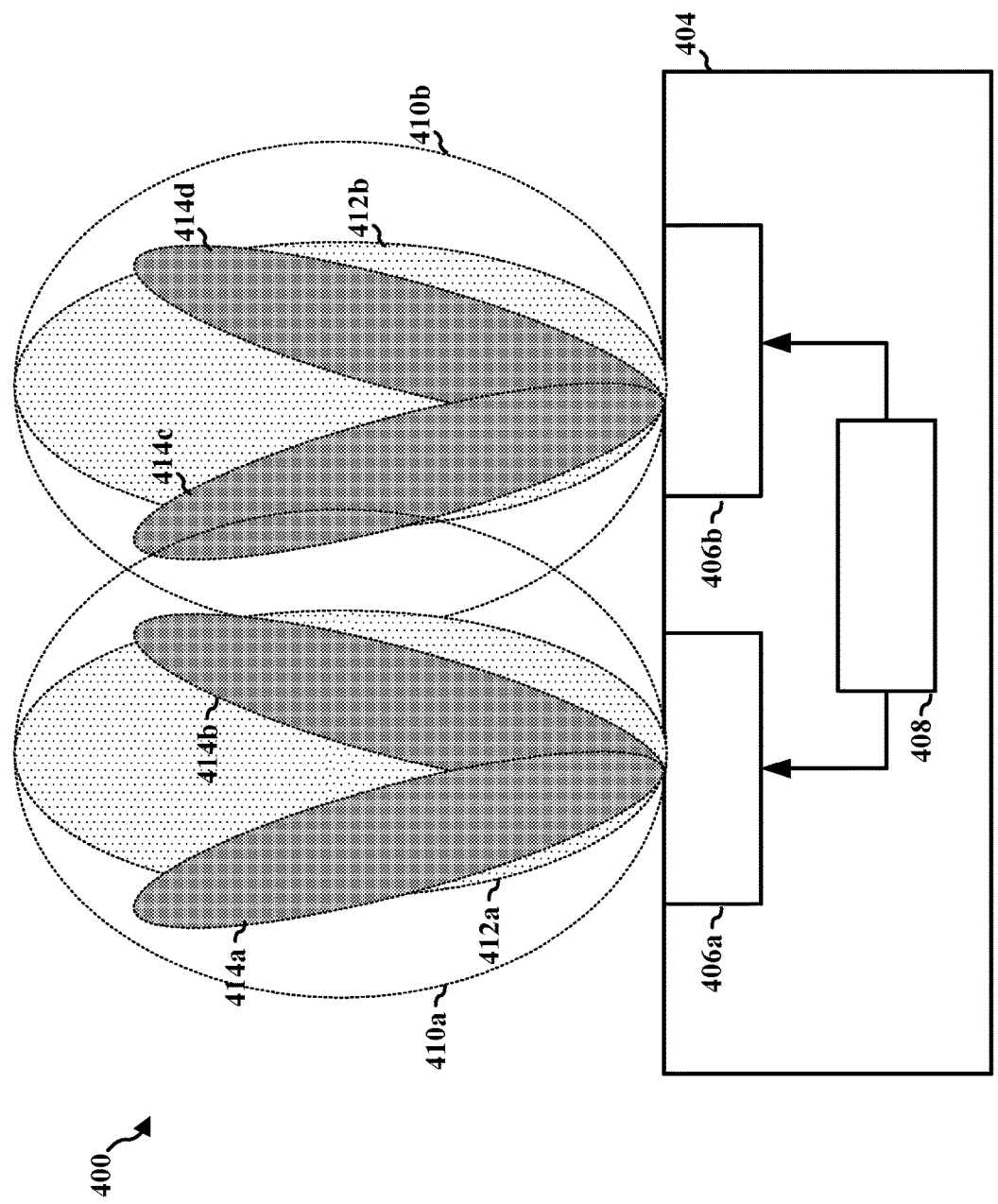
FIG. 4 is a diagram illustrating a UE configured to generate directional beams for beamformed communication.

FIG. 4 is a diagram of a UE 404. The UE 404 may be configured with one or more antenna components 406*a-b* (e.g., antenna subarrays). In various aspects, the UE 404 may include a beam manager 408. The beam manager 408 may include and/or may be communicatively coupled with a beamforming codebook. A codebook may include information corresponding to a beam used for communication, such as a beam index, direction, beam weights across antennas, antenna ordering information, beam steering information (e.g., angles in azimuth and/or zenith), and/or other information associated with a beam. For example, a codebook may include a collection of beamforming vectors (e.g., fixed and/or predefined beamforming vectors), as well as techniques for generating and/or combining vectors (both static as well as dynamic). Beamforming codebooks can be either designed for rank-1 analog beamforming or for higher rank precoding applications. An example of a codebook may include a matrix of beam weights with different column vectors corresponding to the weights used across different antennas for a certain layer of data transmission.

The UE 404 may cause the one or more antenna components 406*a-b* to generate or receive one or more transmit or receive beams 410*a-b*, 412*a-b*, 414*a-d*, which may be directional beams used for beamformed communication. In various aspects, the UE 404 may generate or receive the one or more beams 410*a-b*, 412*a-b*, 414*a-d* based on the beam manager 408. The UE 404 may consider input information that indicates a status of the UE 404, such as whether the UE 404 is highly mobile, when generating beams based on the beam manager 408. Transmit beams are beams of electromagnetic energy transmitted by an antenna subarray. Receive beams relate to how an antenna subarray is tuned and/or how received signals are processed to capture signals traveling in a beam having the angle and width of the receive beam.

In various aspects, the beam manager 408 may arrange beams in the codebook based on a level (for example, a beam level). A level may correspond to a width of a beam and, potentially, a corresponding channel quality measurement, such as signal-to-noise ratio (SNR) and/or reference signal receive power (RSRP). For example, relatively narrower beams may correspond to a relatively higher SNR and/or RSRP, whereas relatively wider beams may correspond to a relatively lower SNR and/or RSRP. In the illustrated example, the beam manager 408 may include beams corresponding to three levels. In some aspects, the beam widths may become narrower as the level increases. While three beams levels are described herein, a greater or fewer number of beam levels may be used without departing from the scope of the present disclosure. Further, beams levels are described herein as inversely proportional to beam width, but different beam levels may correspond to different beam widths without departing from the scope of the present disclosure. For example, the beam level may be proportional to the beam width such that beam widths increase as the level increases. In still other aspects, beam level and beam width may not have a proportional relationship.

Illustratively, the codebook may include information associated with generating beams 410a-b of Level 1, which may be the widest beams for beamforming relative to other beams for beamforming. Similarly, the codebook may include information associated with generating beams 412a-b of Level 2, which may be neither the widest nor the narrowest beams for beamforming relative to other beams for beamforming. Finally, the codebook may include information associated with generating beams 414a-d of Level 3, which may be the narrowest beams for beamforming relative to other beams for beamforming.

Beams may be hierarchically arranged or otherwise organized in the codebook according to width or level. Accordingly, each of the beams 412a-b, 414a-d that are not the widest beams 410a-b for beamforming may have a "parent" beam that is wider than each of the beams 412a-b, 414a-d. The "parent" beams may at least partially spatially contain each of the respective child beams. For example, a beam 410a of Level 1 may at least partially spatially contain the beam 412a of Level 2 and the beams 414a-b of Level 3. Similarly, a beam 412a of Level 2 may at least partially spatially contain the beams 414a-b of Level 3. While the illustrated aspect includes two beams 410a-b of Level 1, two beams 412a-b of Level 2, and four beams 414a-d of Level 3, the present disclosure comprehends any number of beams at any number of levels.

In some aspects, the beam manager 408 may define an uppermost allowable level of a beam (e.g., a maximum or greatest number of beam level that will be accommodated for at least some beamformed communication). That is, the beam manager 408 may define the narrowest width that is allowed for a beam on which the UE 404 may communicate. In one aspect, the beam manager 408 may define the uppermost allowable level of a beam based on the status of the UE 404, for example, including UE mobility and/or other factors.

Illustratively, the motion of the UE 404 may change the angle of arrival (AoA) of a beam on which signals from a base station are received (e.g., by ray tracing the path of signals on beams). Based on the mobility of the UE 404, the AoA of a beam of a base station may be defined by a three-dimensional cone, with the most recent AoA of the beam on which a signal is received from the base station as the axis of the cone. For example, a signal may be received on a beam 412a of Level 2, which may be the serving beam. The beam 412a may function as the axis of a cone, and the cone may be defined by the beams of the UE 404 that are adjacent to the serving beam 412a (e.g., including the adjacent beam 412b). Correspondingly, the size of the cone may be equivalent to the width of the serving beam 412a.

Figure 5:
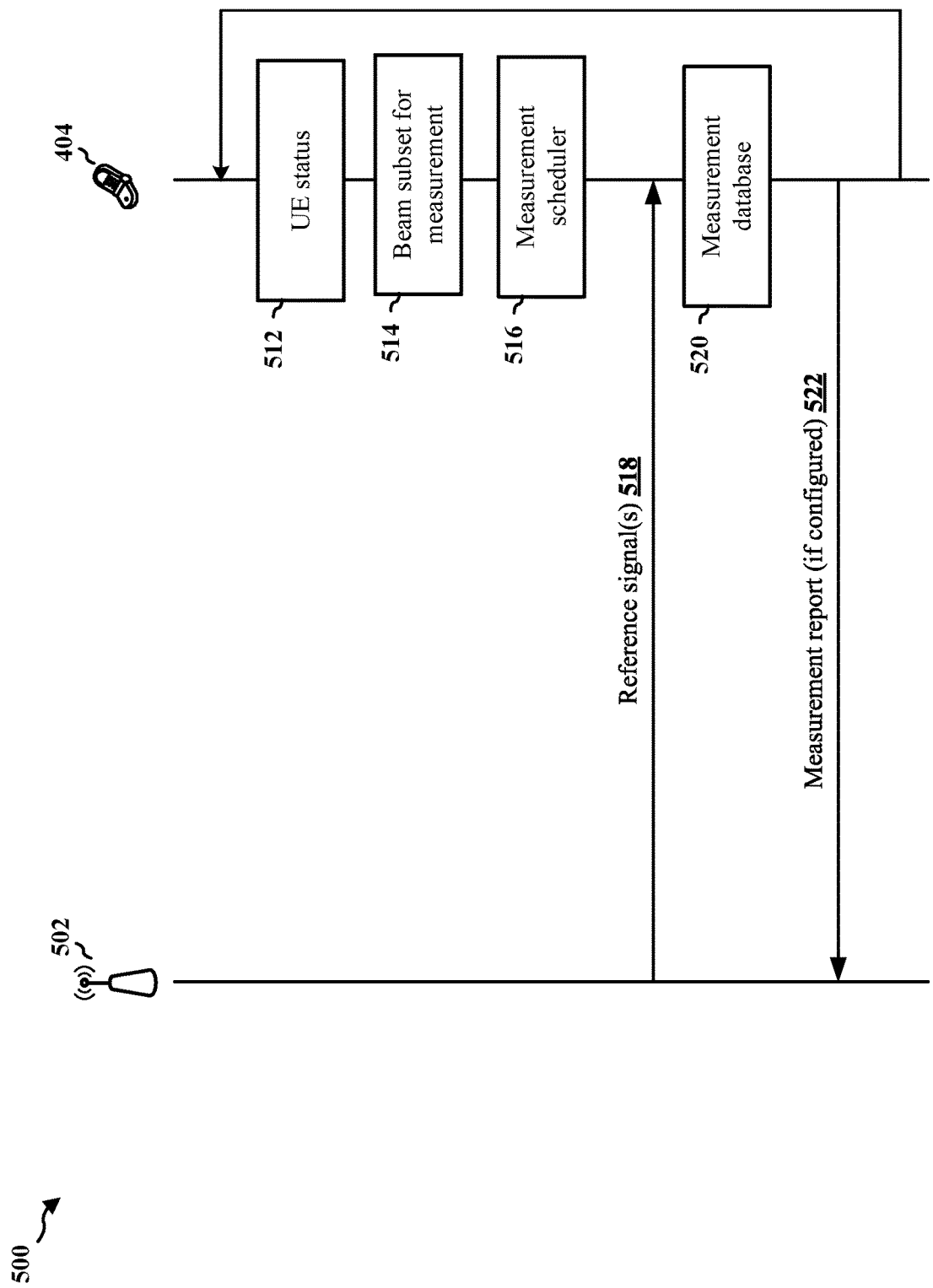
FIG. 5 is a call flow diagram illustrating an example wireless communications environment in which a UE performs measurements for identifying directional beams and reporting to a base station.

FIG. 5 is a call flow diagram of a method of wireless communication. The base station 502 may transmit beamformed signals to the UE 404 in one or more of the directions. The UE 404 may receive one or more beamformed signal(s) from the base station 502 in one or more receive directions. The UE 404 may perform beam training to determine the best receive direction(s) for the UE 404.

According to one example, the base station 502 may transmit one or more reference signals 518 (e.g., periodic reference signals), such as SSB(s) and/or CSI-RS(s). The UE 404 may track one or more beams for one or more base stations, including the base station 502. By tracking one or more beams, the UE 404 may be able to more quickly switch between beams for receiving signals from the one or more base stations.

Referring to FIG. 4, the UE 404 may track one or more of the beams 410a-b, 412a-b, 414a-d. At least one of the beams may be a serving beam for the base station 502; that is, at least one of the beams may be an active beam via which the UE 404 communicates (e.g., transmits or receives) signaling with the base station 502. However, the UE 404 may track a plurality of beams, e.g., because different beams may be serving beams for different channels, different communication directions (e.g., uplink or downlink), and/or different base stations. For example, the UE 404 may track beams adjacent to a strongest beam that is not a serving beam. Illustratively, a "strongest" beam may be a beam having a highest or "best" measured quality or power, such as a beam via which a reference signal is received that has a highest or "best" SNR and/or RSRP. Thus, the strongest beam other than the serving beam may be a beam having the highest or "best" measured quality or power different from another beam via which the UE 404 actively communicates and/or is configured to use to communicate.

In one aspect, the UE 404 may determine a status 512 of the UE 404. The UE status 512 may be based on mobility of the UE 404 and/or other parameters/characteristics of the UE 404. Examples of the UE status 512 may include the speed of the UE 404, direction of travel of the UE 404, acceleration of the UE 404, the scattering environment (e.g., blockers affecting directional beamforming communication), paths between the UE 404 and the base station 502, orientation of the UE 404, and/or other factors that may affect beamforming communication. The UE 404 may determine an uppermost beam level of the UE 404 allowed for beams (i.e., the lowermost allowable beam width) of the UE 404 based on the determination of the status 512 of the UE 404. Referring to FIG. 4, the beam manager 408 may consider (e.g., aggregate) a set of input information (e.g., including UE status, mobility, and/or other information) in order to determine the uppermost beam level.

Based on the determination of the status 512 of the UE 404, the UE 404 may update a subset 514 (e.g., a list) of the beams of the UE 404 on which measurements are to be performed. The UE 404 may implement a process for the update of the subset 514 of beams for measurements. This process may be described herein, and an aspect may be given by FIG. 6, infra.

According to one example, the UE 404 may update the subset 514 of beams by first identifying a first beam associated with a first beam width (and a corresponding first beam level). The UE 404 may identify the first beam based on at least one reference signal received by the UE 404. Referring to FIG. 4, for example, the UE 404 may identify the beam 412b, which may be a beam of Level 2. In one aspect, the beam 412b may be a current serving beam (although not necessarily).

In connection with the identification of the first beam, the UE 404 may determine the subset 514 of the beams based on the first beam width that is associated with the identified first beam. The UE 404 may determine the subset 514 of beams to include at least one beam corresponding to the first beam width. For example, referring to FIG. 4, the UE 404 may determine the subset 514 of beams based on the width of the beam 412a. Further, the UE 404 may determine the subset 514 of beams to include a beam 412b that is spatially adjacent to the identified beam 412a. In some aspects, the UE 404 may determine the subset 514 of beams based on a status of the UE 404, e.g., in addition to the first beam width.

Each of the beams in the subset 514 may be associated with the first beam through at least one of beam direction, beam width, and/or beam spatial containment. For example, a beam may be associated with the first beam by having a spatially similar or adjacent direction, such as a beam direction that is within a threshold number of degrees of the first beam direction and/or a beam direction that is offset from the first beam direction by a relatively small number of degrees. In another example, a beam may be associated with the first beam by having a same or similar beam width, such as a beam width that is approximately equal to the first beam width and/or a beam width within a threshold amount of the first beam width. In a further example, a beam may be associated with the first beam by being a "parent" beam, such as when the beam spatially encompasses at least some or most of the first beam, by being or "child" beam, such as when the beam is at least partially or mostly spatially encompassed by the first beam.

The UE 404 may determine the subset 514 based on an uppermost beam level, which may correspond with a lowermost beam width (e.g., as beam width may be inversely proportional to beam level). The uppermost beam level may be determined by the UE (e.g., determined by the beam manager 408 of FIG. 4). The UE (e.g., beam manager 408) may obtain information indicative of the status of the UE 404 (e.g., mobility of the UE 404 and/or other information), and may determine the uppermost beam level based on the obtained information.

When determining the subset 514 of beams, the UE 404 may determine whether to include at least one of beam(s) corresponding to a second beam width or beams corresponding to a third beam width. That is, the UE 404 may determine whether to include, in the subset 514 of beams, one or more beams corresponding to a level that is higher than the first beam level (e.g., "child" beams) or one or more beams corresponding to a level that is lower than the first beam level (e.g., "parent" beams). The UE 404 may determine whether to include beam(s) corresponding to the second beam width or beams corresponding to the third beam width based on a status of the UE 404 and/or based on the uppermost allowable beam level (e.g., indicated by the beam manager 408).

In some aspects, the one or more beams corresponding to the level that is higher than the first beam level may be at least partially spatially contained by the first beam. For example, referring to FIG. 4, the beams 414a-b may be at least partially spatially contained by the beam 412a. Conversely, the one or more beams corresponding to the level that is lower than the first beam level may at least partially spatially contain the first beam. For example, referring to FIG. 4, the beam 410a may at least partially spatially contain the beam 412a.

Illustratively in the context of FIG. 4, the UE 404 may update the subset 514 of the set of beams 410a-b, 412a-b, 414a-d by determining whether to include beams corresponding to a higher level or beams corresponding to a lower level in the subset 514 of the set of beams 410a-b, 412a-b, 414a-d. For example, the UE 404 may iteratively increase a beam level to be scanned in order to limit a number of beams that are scanned and to allow tracking while changing beam levels.

In order to scan one or more of the set of beams 410a-b, 412a-b, 414a-d, the UE 404 may receive signals on each of the one or more of the set of beams 410a-b, 412a-b, 414a-d to be scanned. For example, the UE 404 may scan beams 412a-b of Level 2 by sweeping through the beams 412a-b and receiving a respective signal (e.g., one of the reference signals 518) from the base station 502 through each of the swept-through Level 2 beams 412a-b. When sweeping through the Level 2 beams, the UE 404 may receive a respective signal on respective one the Level 2 beams 412a-b at a corresponding time (e.g., a symbol, a slot, or other interval corresponding to the respective beam), and the UE 404 may measure a respective value indicative of channel quality based on receiving the respective signal via the respective one of the Level 2 beams 412a-b. The respective value may correspond to the respective one of the Level 2 beams 412a-b via which the respective signal is received at the corresponding time.

When changing beam levels for the update of the subset 514 of beams, the UE 404 may switch scanning between a beam of one width to a beam of another width. For example, the UE 404 may increase the level of the beam on which the UE 404 scans; that is, the UE 404 may reduce the width of the beam. Referring to FIG. 4, the UE 404 may increase the beam level by switching from scanning on the beam 410a to scanning on the beam 412b.

When increasing the beam level, the UE 404 may scan all "child" beams of the beam that is determined to be the strongest. Referring to FIG. 4, the UE 404 may determine that the UE beam 412a is stronger than the adjacent beam 412b. Accordingly, the UE 404 may scan the "child" beams 414a-b of the UE beam 412a.

In another example, the UE 404 may decrease the level of the beam on which the UE 404 scans when changing beam levels for the update of the subset 514 of beams. When reducing the level of the beam (i.e., increasing the width of the beam), the UE 404 may directly scan adjacent beams at the same level as the strongest beam. Because beams of an higher level may not be scanned when decreasing the level of the beam, the UE 404 may refrain from iterating through beams of a higher level (e.g., "child" beams). Scanning adjacent beams may improve the speed at which the UE 404 recovers the link (e.g., by switching beams), e.g., when the UE 404 suddenly moves and the serving beam is lost.

In association with the update of the subset 514 of beams to be scanned for measurement, the UE 404 may implement a measurement scheduler 516. The measurement scheduler 516 may schedule each beam of the subset 514 of beams to be scanned. For example, the measurement scheduler 516 may schedule the frequency and/or subcarrier to be scanned, as well as the subframe or slot in which to perform the measurement.

The base station 502 may transmit, to the UE 404, reference signals 518. Such reference signals 518 may be SSBs and/or CSI-RSs, which may be periodically transmitted by the base station 502. The UE 404 may receive the periodic reference signals on each beam of the subset 514 of beams, and the UE 404 may measure a value indicative of channel quality for each beam of the subset 514 of beams. Examples of measurements indicative of channel quality may include SNR, RSRP, reference signal receive quality (RSRQ), reference signal strength indicator (RSSI), signal-to-interference-plus-noise ratio (SINR), and other similar measurements.

The UE 404 may update a measurement database 520 based on the values measured for each beam of the subset 514. Therefore, the measurement database 520 may indicate which beams 410*a-b*, 412*a-b*, 414*a-d* are strongest in which direction. In one aspect, the UE 404 may refer to the measurement database 520 in order to identify one of the beams 410*a-b*, 412*a-b*, 414*a-d* to which to switch, e.g., when the UE 404 loses a link through a serving beam, when the channel quality of the serving beam drops below a threshold, etc.

In one aspect, the UE 404 may be configured to report measurements associated with beams to the base station 502. Accordingly, the UE 404 may transmit, to the base station 502, a measurement report 522 when the UE 404 is configured for measurement reporting. The measurement report 522 may indicate one or more values (e.g., SNR(s), RSRP(s), etc.) measured for one or more of the beams scanned in the subset 514 of beams. In some aspects, the base station 502 may configure the UE 404 to communicate on one or more of the beams 410*a-b*, 412*a-b*, 414*a-d* based on the measurement report 522.

In various aspects, the UE 404 may repeat one or more of the aforementioned operations. For example, when the UE 404 experiences a change to the status 512, the UE 404 may update the subset 514 of beams that are to be scanned for measurements.

Figure 6:
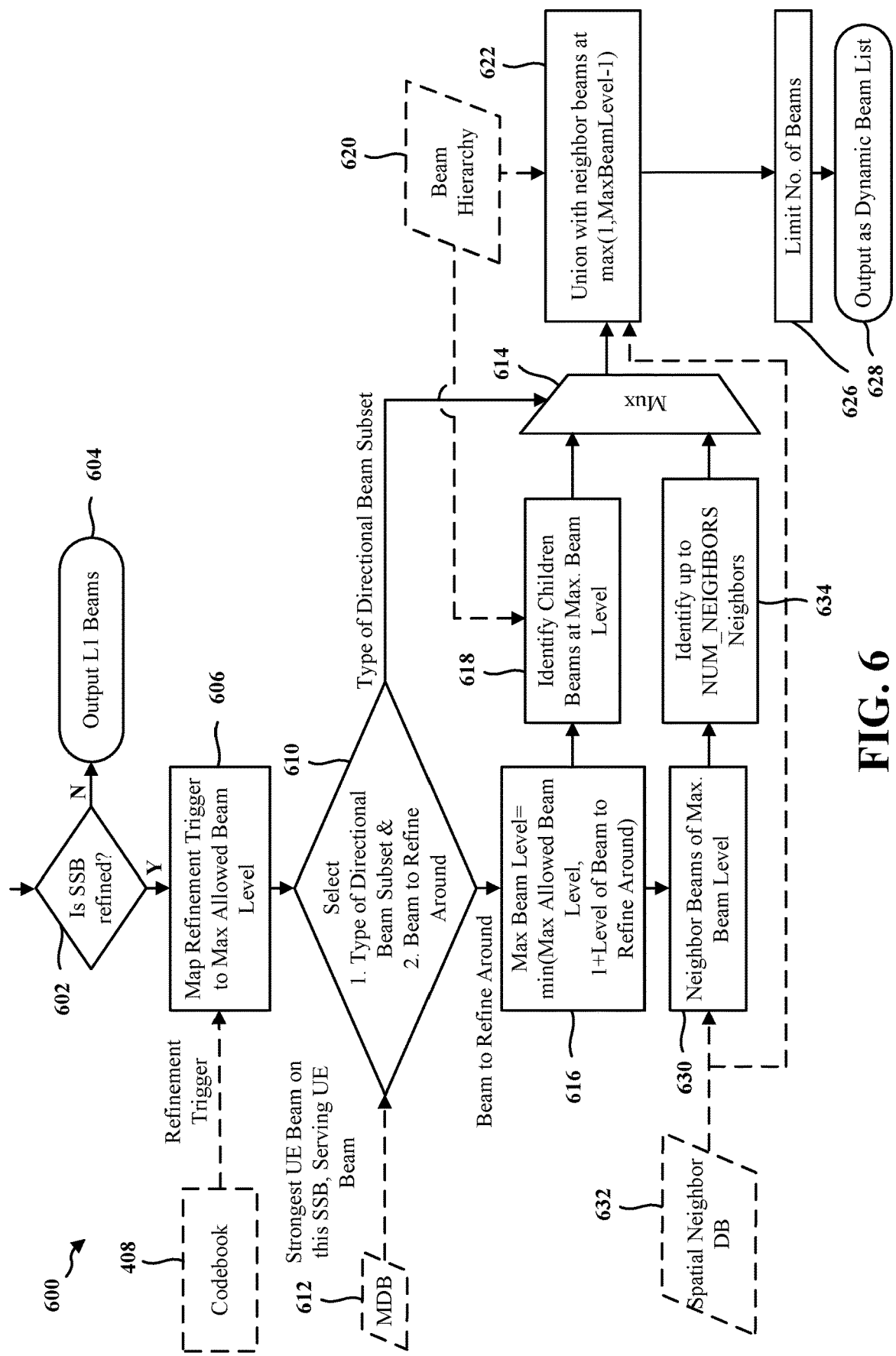
FIG. 6 is a flowchart of an example method for identifying directional beams for wireless communication.

FIG. 6 illustrates a method 600 of updating a subset of beams to be scanned for measurements. According to various aspects, one or more of the illustrated operations may be transposed, omitted, and/or contemporaneously performed. The method 600 may be performed by a UE (e.g., the UE 104, 350, 404; the apparatus 802/802'; the processing system 914, which may include the memory 360 and which may be the entire UE 104, 350, 404 or a component of the UE 104, 350, 404, such as the TX processor 368, the RX processor 356, and/or the controller/processor 359). In the context of FIG. 5, the UE 404 may implement the method 600 when the UE 404 is to update the subset 514 of beams, e.g., when the UE 404 experiences a change to the status 512 of the UE 404.

In the example method 600, beam widths correspond to one of Level 0 through Level 3, with Level 0 being the widest and Level 3 being the narrowest. This example method 600 is intended to be illustrative, and a different number of levels and/or level numbering, as well as a different number of corresponding beam widths, are contemplated by the present disclosure.

At operation 602, the UE may receive at least one reference signal from a base station, and the at least one reference signal may be received on a receive beam of the UE 404. The UE may determine whether the beam on which the at least one reference signal is received is to be refined around. For example, referring to FIGS. 4-5, the UE 404 may receive a reference signal 518 from the base station 502. The UE 404 may receive a reference signal 518 on a beam 412*a*. In one example, the beam 412*a* may be a serving UE beam that is tuned toward a serving beam of the base station. In another example, the beam 412*a* may not be a serving UE beam that is tuned toward a serving beam of the base station; rather, the beam 412*a* may be a beam that is tuned toward a non-serving beam of the base station and on which a reference signal having a strongest SNR and/or RSRP is received.

In various aspects, the UE may track beams for one or more base stations. In scanning and tracking a plurality of beams for different base stations and/or different channels, the UE may store measurements indicative of qualities of the plurality of beams. The UE may be able to more quickly switch beams for different base stations and/or different channels by maintaining measurements for other beams in addition to a current serving beam.

If the UE determines that the beam on which at least one reference signal is received is not to be refined around, then the UE may output a subset of beams, e.g., that correspond to a Level 1 (e.g., the level corresponding to the width of the beam on which the at least one reference signal is received), as illustrated at operation 604. Referring to FIGS. 4-5, the UE 404 may output one or more beams that correspond with a Level 1 (e.g., at least one of the beams 410*a-b*).

If the UE determines that the beam on which at least one reference signal is received is to be refined around, then the UE may map a beam refinement trigger to a uppermost allowable beam level, as illustrated at operation 606. A beam manager 408 of the UE may provide the refinement trigger, which may be based on a status of the UE. For example, the beam manager 408 may provide an indication of whether a beam on which at least one reference signal is received is to be refined around, as well as an indication of the uppermost allowable beam level to be used for refinement (e.g., whether the subset of beams is to include "parent" beam(s) or "child" beam(s)). Referring to FIGS. 4-5, for example, the beam manager 408 may determine the status 512 of the UE 404 and, based on the status 512, the beam manager 408 may indicate the beam to be refined around and the uppermost allowable beam level.

At operation 610, the UE may select (1) the type of directional beam set and (2) the beam that is to be refined around. When the UE selects the type of directional beam set, the UE may determine the whether to include, in the subset of beams, beam(s) of a higher level (e.g., "child" beam(s)) or beam(s) of a lower level (e.g., "parent" beam(s)). In some aspects, the UE may select the type of directional beam to be included in the subset based on information from the beam manager 408 (e.g., a status of the UE, a uppermost allowable beam level, etc.). The UE may use the selected type of directional beam subset for a multiplexing operation 614, infra.

When the UE selects the beam that is to be refined around, the UE may select a beam identifier (ID) or index that corresponds to the beam on which the at least one reference signal is received. For example, the beam to be refined around may define the axis of a three-dimensional cone having a size that is equivalent to the width of the beam to be refined around, and the type of directional beam set may include the beams (e.g., spatially adjacent or "neighboring" beams) that define the surface of the three-dimensional cone.

In various aspects, the UE may include a measurement database (MDB) 612. The MDB 612 may include information associated with the beams on which the UE may receive. Specifically, the MDB 612 may include measurements indicative of qualities for beams. For example, the MDB 612 may include a respective RSRP and/or SNR for each of the set of beams on which the UE may receive reference signals from at least one base station.

The MDB 612 may provide information indicating the current serving beam. The MDB 612 may provide information indicating the strongest beam on which a particular at least one reference signal is received, and the strongest beam may correspond to a beam having a highest RSRP and/or SNR.

The UE may select a current serving beam to refine around, e.g., in order to reduce latency commensurate with switching a serving beam when the UE is highly mobile. Additionally, the UE may select the beam to refine around based on the strongest beam on which a particular at least one reference signal is received, e.g., because the UE may track other beams in addition to the current serving beam for different base stations and/or different channels.

Referring to FIGS. 4-5, the UE 404 may select the type of directional beam (e.g., beams of a higher level or beams of a lower level) to be included in the subset 514 of beams, and the UE 404 may select the beam to be refined around. For example, the UE 404 may select the beam 412a around which to refine, which may correspond to Level 2. Therefore, the UE 404 may determine to include, in the subset 514 of beams, at least one of the beams 414a-b of Level 3 when the type of directional beam is selected to be beams of higher level. Similarly, the UE 404 may determine to include, in the subset 514, the beam 410a of Level 1 when the type of directional beam is selected to be beams of a lower level.

At operation 616, the UE may determine the uppermost beam level based on the beam to be refined around. The uppermost beam level may be the minimum between the uppermost allowable beam level indicated by the beam manager 408 and the level of the beam to be refined around plus one. For example, referring to FIGS. 4-5, the beam manager 408 may indicate that the uppermost allowable beam level is Level 2 and the beam to be refined around is the beam 412a of Level 2; therefore, the UE may determine the uppermost beam level to be the Level 2 indicated by the beam manager 408 because Level 2 is lower than Level 2 of the beam 412a plus one.

The UE may generate a list that indicates beams on which measurements are to be performed. In some aspects, the UE may generate a list for beams of a higher level and may generate a list for beams of a lower level, regardless of which the type of directional beam subset is selected by the UE. Thus, at operation 618, the UE may identify the "child" beams of the determined uppermost beam level. For example, the UE may generate a list that may include one or more beams that are of a higher level (i.e., narrower width) than beams of the determined uppermost beam level. For example, referring to FIGS. 4-5, the UE 404 may identify the beams 414a-b that are at least partially spatially contained by the beam 412a.

In various aspects, the UE may include information indicating the beam hierarchy 620 of beams that may be generated by the UE. The beam hierarchy 620 may indicate how each beam at each level is hierarchically related to one another. For example, the beam hierarchy 620 may indicate one or more beams that are at least partially spatially contained by the beam to be refined around (e.g., "child" beams). Accordingly, the UE may identify the list of "child" beams based on the information indicated in the beam hierarchy 620.

At operation 630, the UE may determine the neighboring beams at the uppermost beam level. The neighboring beams at the uppermost beam level may include beams of a level that corresponds to the determined uppermost beam level (pursuant to operation 616). For example, if the determined uppermost beam level is Level 2, then the UE may identify neighboring beams of Level 2, which may correspond to the level of the beam to be refined around. Referring to FIGS. 4-5, the UE may identify the neighboring beam 412b, which may be adjacent to the beam 412a to be refined around.

In some aspects, the UE may limit (e.g., down sample) the number of neighboring beams that are to be included in the list of neighboring beams. Thus, at operation 634, the UE may determine the list of neighboring beams that are spatially adjacent to the beam to be refined around, but limited to a number of beams that is within a predefined threshold (e.g., "NUM_NEIGHBORS"). Referring to FIGS. 4-5, the UE 404 may identify the neighboring beam 412b, but may omit other neighboring beams of Level 2.

At operation 614, the UE may multiplex the list of "child" beams and the list of "neighboring" beams based on the selected type of directional beam subset. From the multiplexing operation 614, the UE may obtain either the list of "child" beams or the list of "neighboring" beams. Referring to FIGS. 4-5, when the UE 404 is to refine around the beam 412a, the UE 404 may obtain either a list that includes the "child" beams 414a-b that are at least partially spatially contained by the beam 412a or a list that includes the "neighboring" beam 412b that is of the same level as the beam 412a (e.g., Level 2).

At operation 622, the UE may combine (e.g., union) the list of "child" or "neighboring" beams with the neighboring beams corresponding to a level that is the uppermost between Level 1 and the determined uppermost beam level (pursuant to operation 616) minus 1. For example, if the determined uppermost beam level is Level 2, and the UE selects the list of "child" beams of Level 3, then the UE may combine the list of "child" beams of Level 3 with the beams that are spatially adjacent to the beam of Level 2, which may be the beam to be refined around. The UE may obtain information indicating the spatially adjacent beams from the spatial neighbor database 632. Referring to FIGS. 4-5, the UE 404 may combine the list of "child" beams that includes the beams 414a-b with the beam 412b that is spatially adjacent to the beam 412a that is to be refined around.

However, if the UE selects the list of "neighboring" beams of Level 2, then the UE may combine (e.g., union) the list of "neighboring" beams with beams of Level 1 (e.g., the "parent" beam of the beam to be refined around and the beams that are spatially adjacent to the "parent" beam). The UE may obtain information indicating the "parent" beam from the beam hierarchy 620, and may obtain information indicating the beams that are spatially adjacent to the "parent" beam from the spatial neighbor database 632. Referring to FIGS. 4-5, the UE 404 may combine the list of "neighboring" beams that includes the beam 412b with the beams 410a-b, which includes the "parent" beam 410a of the beam 412a to be refined around and the spatially adjacent beam 410b.

At operation 626, the UE may limit the number of beams in the combined list of beams to a predefined threshold. For example, the UE may down sample the number of beams to be included in the subset of beams on which measurements are to be performed. For example, the UE may down sample the combined list of beams to remove one or more beams that are the most spatially distant relative to the beam to be refined around.

At operation 628, the UE may output the combined list of beams, limited by the predefined threshold, as a subset of beams on which measurements are to be performed. In the context of FIGS. 4-5, the UE 404 may output the subset 514 of beams on which measurements are to be performed. By way of example, the UE 404 may output a subset 514 that includes the beams 412a-b, 414a-b when the beam 412a is to be refined around and the UE selects "child" beams as the type of directional beam (assuming the number of beams does not exceed a predefined threshold number of beams). In another example, the UE 404 may output a subset 14 that includes the beams 410a-b, 412a-b when the beam 412a is to be refined around and the UE selects "neighboring" beams as the type of directional beam (assuming the number of beams does not exceed a predefined threshold number of beams).

Table 1, infra, illustrates examples of a subset of beams, which may be based on the determined uppermost beam level (pursuant to operation 616). The level (denoted "L") may include all beams at the indicated level, assuming those beams are not omitted due to the limiting to the predefined threshold.

TABLE 1

| Level of Strongest UE Beam | Dynamic Beam Output | |
| --- | --- | --- |
| | Level < Determined Uppermost Beam Level | Level == Determined Uppermost Beam Level |
| 0 | All L0 beams, L1 "child" beams | N/A |
| 1 | L1 "neighboring" beams, L2 "child" beams | L1 "neighboring" beams, L0 "parent" beam and "neighboring" beams |
| 2 | L2 "neighboring" beams, L3 "child" beams | L2 "neighboring" beams, L1 "parent" beam and "neighboring" beams |
| 3 | N/A | L3 "neighboring" beams, L2 "parent" beam and "neighboring" beams |

Figure 7:
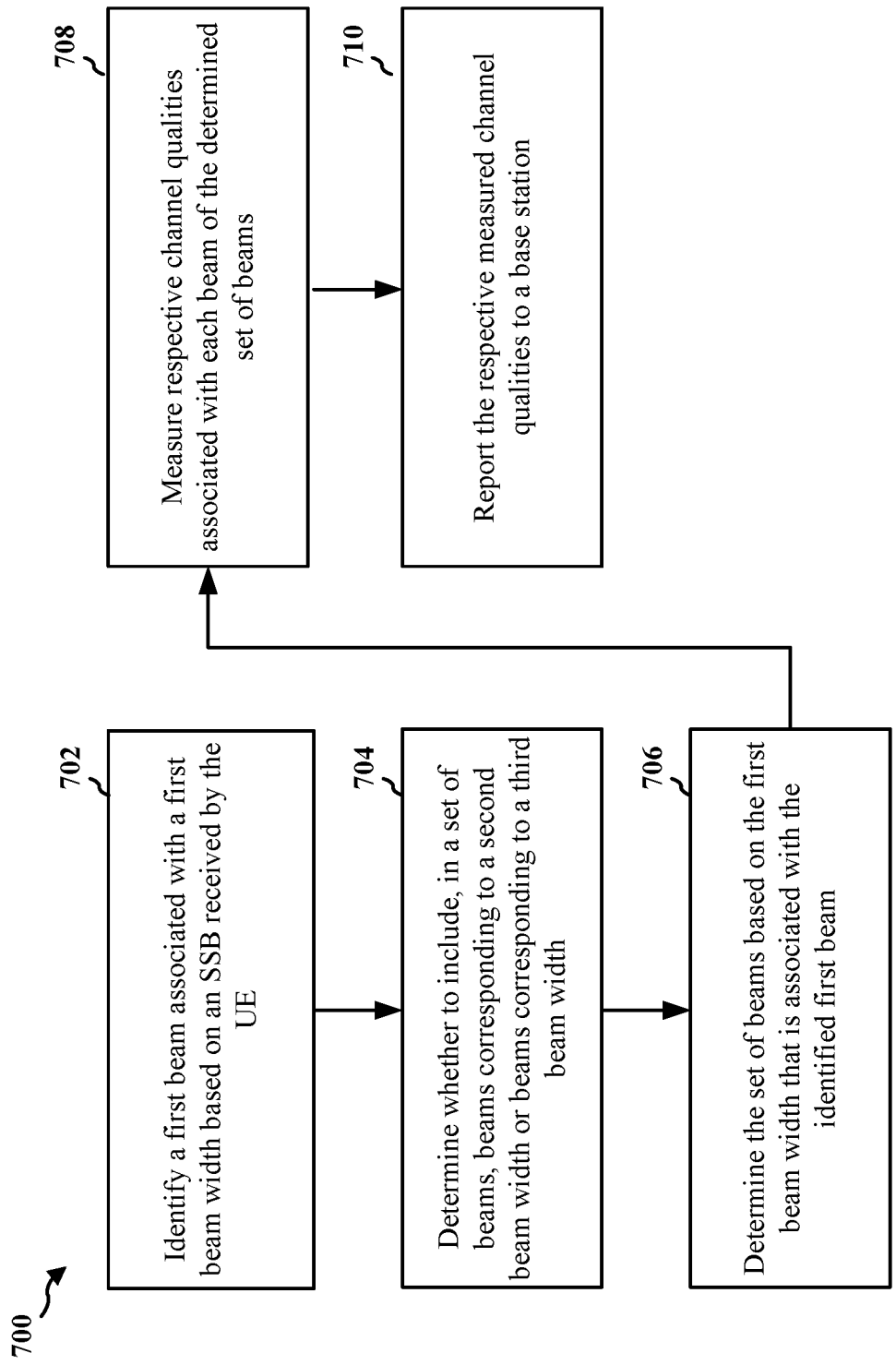
FIG. 7 is a flowchart of an example method for identifying directional beams and measurement reporting.

FIG. 7 is a flowchart of a method 700 of wireless communication. The method 700 may be performed by a UE (e.g., the UE 104, 350, 404; the apparatus 802/802'; the processing system 914, which may include the memory 360 and which may be the entire UE 104, 350, 404 or a component of the UE 104, 350, 404, such as the TX processor 368, the RX processor 356, and/or the controller/processor 359). According to various aspects, one or more of the illustrated operations may be transposed, omitted, and/or contemporaneously performed.

At operation 702, the UE may identify a first beam associated with a first beam width based on at least one reference signal received by the UE. In one example, the UE may determine a beam that is a current serving beam, and the UE may identify the first beam as the current serving beam. In another example, the UE may compare channel qualities corresponding to a plurality of different beams, and the UE may select the beam having the strongest channel quality (e.g., highest RSRP measured for reference signal(s) received on that beam).

In the context of FIGS. 4-6, the UE 404 may identify a first beam associated with a first beam width based on at least one reference signal received by the UE 404, e.g., from the base station 502. For example, the UE 404 may identify the beam 412a having a beam width corresponding to Level 2.

At operation 704, the UE may determine whether to include, in a set of beams on which measurements are to be performed, beams corresponding to a second beam width or beams corresponding to a third beam width. The second beam width may be narrower than the first beam width, whereas the third beam width may be wider than the first beam width.

In one aspect, the determination of whether to include beams corresponding to a second beam width or beams corresponding to a third beam width may be based on a status of the UE. The status of the UE may be based at least partially on a mobility of the UE. For example, the UE may determine the status of the UE, and the UE may determine to include either beams corresponding to the second beam width or beams corresponding to the third beam width based on the determined status of the UE.

In the context of FIGS. 4-6, the beam manager 408 may determine a status 512 of the UE 404, and the beam manager 408 may output information indicating whether to include beams corresponding to Level 1 (i.e., beams wider than Level 2 of the identified beam 412a) or beams corresponding to Level 3 (i.e., beams narrower than Level 2 of the identified beam 412a).

In one aspect, the determination of whether to include beams corresponding to a second beam width or beams corresponding to a third beam width may be based on a minimum allowable beam width, which may correspond to a uppermost allowable beam level. A beam manager of the UE may define the minimum allowable beam width, e.g., based on the status of the UE. In the context of FIGS. 4-6, the beam manager 408 may output information indicating the minimum allowable beam width corresponding to the uppermost allowable beam level.

At operation 706, the UE may determine (e.g., identify) one or more beams to be included in the set of beams on which measurements are to be performed. The UE may determine the one or more beams based on the first beam width that is associated with the first beam. For example, the UE may identify one or more beams that correspond to the first beam width (e.g., beams that are spatially adjacent to the first beam), and the UE may include the one or more beams in the set of beams.

In the context of FIGS. 4-6, the UE 404 may determine the "neighboring" beam 412b to be included in the subset 514 of beams on which measurements are to be performed, e.g., because the "neighboring" beam 412b is of a same level (e.g., Level 2) as the identified beam 412a.

Further to operation 706, the UE may determine, based on the determination of whether to include beams corresponding to the second beam width or beams corresponding to the third beam width, one or more beams of the second beam width to include in the set of beams or one or more beams of the third beams width to include in the set of beams. In one aspect, the UE may determine the one or more beams of the second beam width or the third beam width based on the status of the UE, which may be defined by the beam manager of the UE.

When the UE determines to include beams corresponding to the second beam width, the UE may identify one or more beams that are narrower than the identified first beam and are at least partially spatially contained by the identified first beam (e.g., "child" beams of the identified first beam). In the context of FIGS. 4-6, the UE 404 may determine to include the "child" beams 414a-b when the minimum allowable beam width is corresponds to the second beam width.

When the UE determines to include beams corresponding to the third beam width, the UE may identify one or more beams that are wider than the identified first beam, one of which may at least partially spatially contain the identified first beam (e.g., a "parent" beam of the identified first beam). In the context of FIGS. 4-6, the UE 404 may determine to include the "parent" beams 410a when the minimum allowable beam width is corresponds to the first beam width, and the UE 404 may include the beam 410b that is spatially adjacent to the "parent" beam 410a.

At operation 708, the UE may measure respective channel qualities associated with each beam of the determined set of beams. For example, the UE may schedule each of the set of beams for a respective measurement. Based on the scheduling, the UE may receive periodic reference signals from the base station on each beam of the set of beams, and the UE may measure a value indicative of channel quality (e.g., RSRP) based on each reference signal received on each beam. The UE may update a measurement database to reflect the channel qualities corresponding to each beam of the set of beams.

In the context of FIGS. 4-6, the UE 404 may schedule each beam of the subset 514 of beams for a measurement. When the UE 404 receives the reference signals 518 from the base station 502, the UE 404 may measure a respective channel quality for each beam that is scheduled. Accordingly, the UE 404 may update the measurement database 520 based on the measured channel qualities.

At operation 710, the UE may report the measured channel qualities to the base station, if the UE is configured for measurement reporting. For example, the UE may generate a report that indicates one or more beams and one or more respective values indicative of channel quality for each of the one or more beams, and the UE may send the report to the base station. In the context of FIGS. 4-6, the UE 404 may generate a measurement report 522 based on the measurements for the channel qualities of the subset 514 of beams, and the UE 404 may sent the measurement report 522 to the base station 502.

At operation 712, the UE may switch the current serving beam from the first beam to a second beam that is included in the set of beams. In one aspect, the switch of the current serving beam from the first beam to the second beam may be based on the measured channel qualities. For example, the UE may compare the respective channel qualities to one another to determine a second beam on which a signal having a strongest received power (e.g., RSRP) is received, and the UE may select the second beam to be a serving beam of the UE, which may be tuned toward a serving beam of the base station. In the context of FIGS. 4-6, the UE 404 may switch the current serving beam from the first beam 412a to a second beam, such as the adjacent beam 412b, a child beam 414a, or a parent beam 410a.

Figure 8:
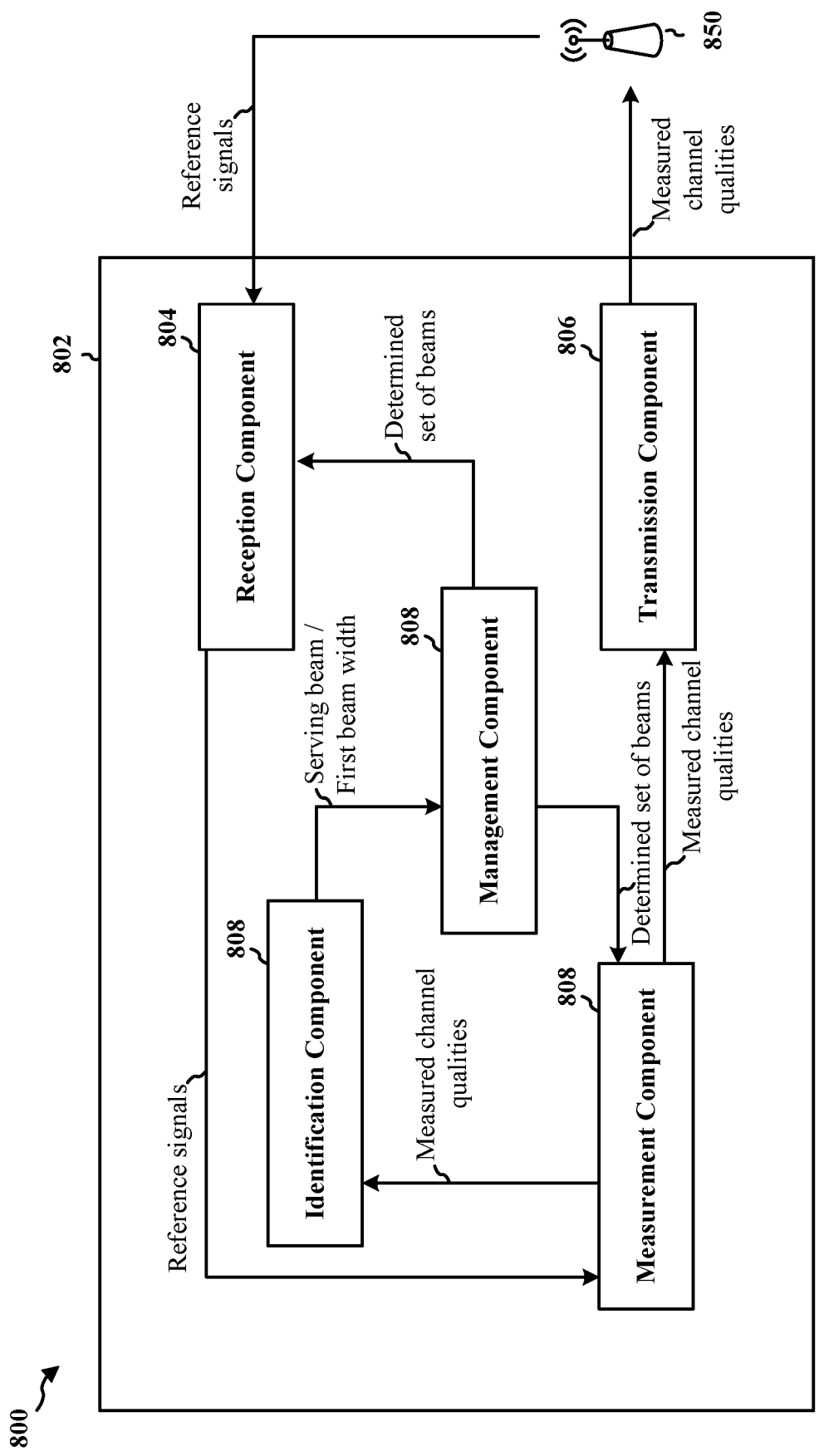
FIG. 8 is a conceptual data flow diagram illustrating the data flow between different means/components in an example apparatus.

FIG. 8 is a conceptual data flow diagram 800 illustrating the data flow between different means/components in an example apparatus 802. The apparatus 802 may be a UE. The apparatus 802 includes a reception component 804 configured to receive signaling from a base station 850, and includes a transmission component 806 configured to transmit signaling to the base station 850.

The apparatus 802 may further include an identification component 808 configured to identify a first beam associated with a first beam width based on at least one reference signal received by the reception component 804, e.g., as described in connection with operation 702 of FIG. 7. In one example, the identification component 808 may determine a beam that is a current serving beam, and the identification component 808 may identify the first beam as the current serving beam. In another example, the identification component 808 may compare channel qualities corresponding to a plurality of different beams, and the identification component 808 may select the beam having the strongest channel quality (e.g., highest SNR and/or highest RSRP measured for reference signal(s) received on that beam).

The apparatus 802 may further include a management component 810 configured to determine whether to include, in a set of beams on which measurements are to be performed, beams corresponding to a second beam width or beams corresponding to a third beam width, e.g., as described in connection with operation 704 of FIG. 7. The second beam width may be narrower than the first beam width, whereas the third beam width may be wider than the first beam width.

In one aspect, the management component 810 may determine whether to include beams corresponding to a second beam width or beams corresponding to a third beam width in the set of beams based on a status of the apparatus 802. The status of the apparatus 802 may be based at least partially on a mobility of the apparatus 802. For example, the management component 810 may determine the status of the apparatus 802, and the management component 810 may determine to include either beams corresponding to the second beam width or beams corresponding to the third beam width based on the determined status of the apparatus 802.

In one aspect, the determination of whether to include beams corresponding to a second beam width or beams corresponding to a third beam width may be based on a minimum allowable beam width, which may correspond to a uppermost allowable beam level. The management component 810 may define the minimum allowable beam width, e.g., based on the status of the apparatus 802.

The management component 810 may be further configured to determine (e.g., identify) one or more beams to be included in the set of beams on which measurements are to be performed, e.g., as described in connection with operation 706 of FIG. 7. The management component 810 may determine the one or more beams based on the first beam width that is associated with the first beam. For example, the management component 810 may identify one or more beams that correspond to the first beam width (e.g., beams that are spatially adjacent to the first beam), and the management component 810 may include the one or more beams in the set of beams.

In some further aspects, the management component 810 may be further configured to determine, based on the determination of whether to include beams corresponding to the second beam width or beams corresponding to the third beam width, one or more beams of the second beam width to include in the set of beams or one or more beams of the third beams width to include in the set of beams. For example, the management component 810 may determine the one or more beams of the second beam width or the third beam width based on the status of the apparatus 802.

When the management component 810 determines to include beams corresponding to the second beam width, the management component 810 may identify one or more beams that are narrower than the identified first beam and are at least partially spatially contained by the identified first beam (e.g., "child" beams of the identified first beam). When the management component 810 determines to include beams corresponding to the third beam width, the management component 810 may identify one or more beams that are wider than the identified first beam, one of which may at least partially spatially contain the identified first beam (e.g., a "parent" beam of the identified first beam).

The apparatus 802 may further include a measurement component 812 configured to measure respective channel qualities associated with each beam of the determined set of beams, e.g., as described in connection with operation 708 of FIG. 7. For example, the measurement component 812 may schedule each of the set of beams for a respective measurement. Based on the scheduling, the reception component 804 may receive periodic reference signals from the base station 850 on each beam of the set of beams, and the measurement component 812 may measure a value indicative of channel quality (e.g., SNR, RSRP, etc.) based on each reference signal received on each beam. The measurement component 812 may update a measurement database to reflect the channel qualities corresponding to each beam of the set of beams.

The transmission component 806 may be configured to report (e.g., transmit) the measured channel qualities to the base station, if the UE is configured for measurement reporting, e.g., as described in connection with operation 710 of FIG. 7. For example, the measurement component 812 may generate a report that indicates one or more beams and one or more respective values indicative of channel quality for each of the one or more beams, and the transmission component 806 may transmit the report to the base station.

In some aspects, the management component 810 may be further configured to switch the current serving beam from the first beam to a second beam that is included in the set of beams, e.g., as described in connection with operation 712 of FIG. 7. In one aspect, the switch of the current serving beam from the first beam to the second beam may be based on the measured channel qualities. For example, the management component 810 may compare the respective channel qualities to one another to determine a second beam on which a signal having a strongest quality (e.g., highest SNR, highest RSRP, etc.) is received, and the management component 810 may select the second beam to be a serving beam of the apparatus 802, which may be tuned toward a serving beam of the base station 850.

The apparatus may include additional components that perform each of the blocks of the algorithm in the aforementioned flowcharts of FIGS. 6-7. As such, each block in the aforementioned flowcharts of FIGS. 6-7 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 9:
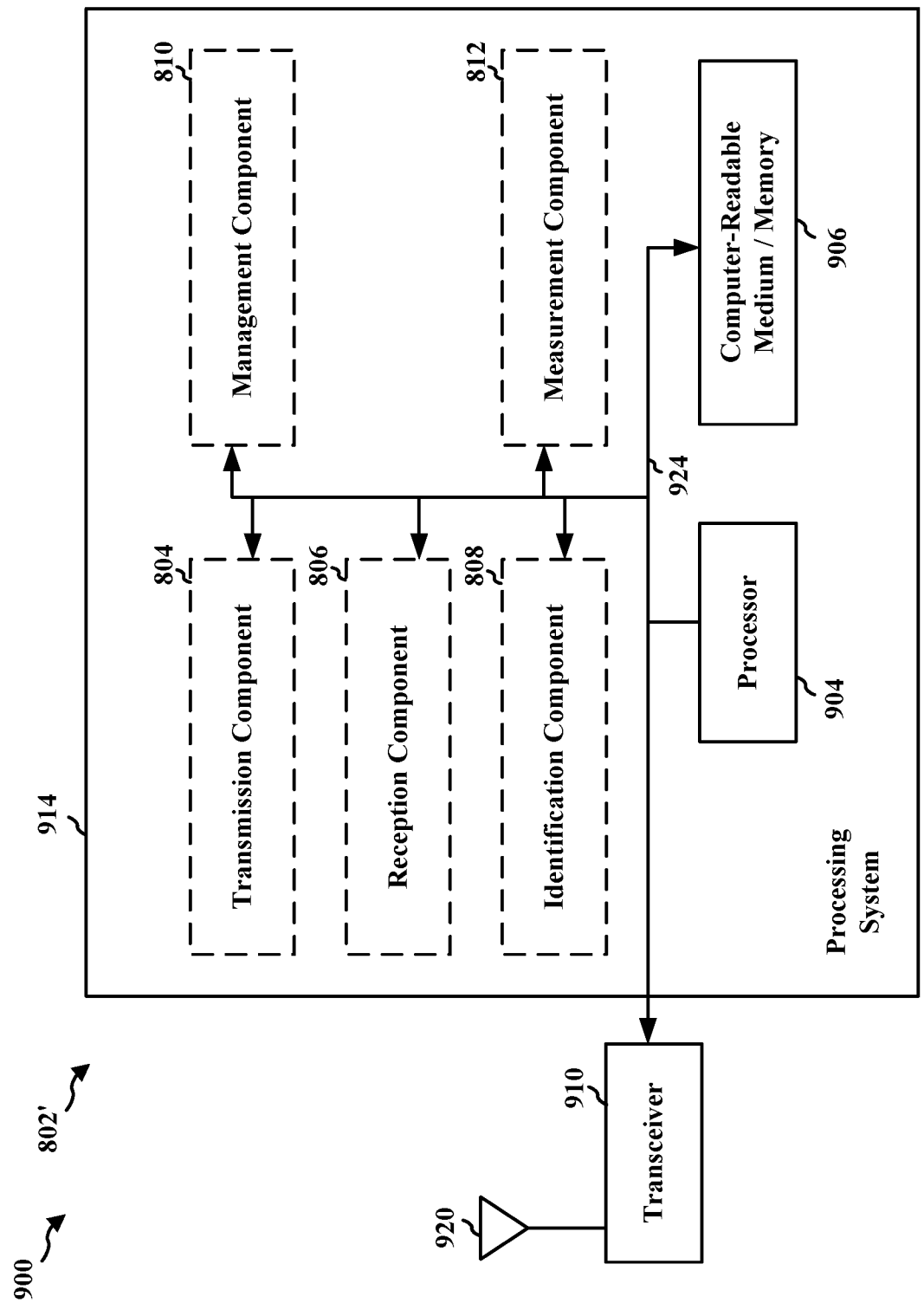
FIG. 9 is a diagram illustrating an example of a hardware implementation for an apparatus employing a processing system.

FIG. 9 is a diagram 900 illustrating an example of a hardware implementation for an apparatus 802' employing a processing system 914. The processing system 914 may be implemented with a bus architecture, represented generally by the bus 924. The bus 924 may include any number of interconnecting buses and bridges depending on the specific application of the processing system 914 and the overall design constraints. The bus 924 links together various circuits including one or more processors and/or hardware components, represented by the processor 904, the components 804, 806, 808, 810, 812 and the computer-readable medium/memory 906. The bus 924 may also link various other circuits such as timing sources, peripherals, voltage regulators, and power management circuits, which are well known in the art, and therefore, will not be described any further.

The processing system 914 may be coupled to a transceiver 910. The transceiver 910 is coupled to one or more antennas 920. The transceiver 910 provides a means for communicating with various other apparatus over a transmission medium. The transceiver 910 receives a signal from the one or more antennas 920, extracts information from the received signal, and provides the extracted information to the processing system 914, specifically the reception component 804. In addition, the transceiver 910 receives information from the processing system 914, specifically the transmission component 806, and based on the received information, generates a signal to be applied to the one or more antennas 920. The processing system 914 includes a processor 904 coupled to a computer-readable medium/memory 906. The processor 904 is responsible for general processing, including the execution of software stored on the computer-readable medium/memory 906. The software, when executed by the processor 904, causes the processing system 914 to perform the various functions described supra for any particular apparatus. The computer-readable medium/memory 906 may also be used for storing data that is manipulated by the processor 904 when executing software. The processing system 914 further includes at least one of the components 804, 806, 808, 810, 812. The components may be software components running in the processor 904, resident/stored in the computer readable medium/memory 906, one or more hardware components coupled to the processor 904, or some combination thereof. The processing system 914 may be a component of the UE 350 and may include the memory 360 and/or at least one of the TX processor 368, the RX processor 356, and the controller/processor 359. Alternatively, the processing system 914 may be the entire UE (e.g., see 350 of FIG. 3).

In one configuration, the apparatus 802/802' for wireless communication includes means for identifying a first beam associated with a first beam width based on at least one reference signal received by the apparatus 802/802'; means for determining a set of beams based on the first beam width that is associated with the identified first beam, the determined set of beams including at least one beam corresponding to the first beam width; and means for measuring respective channel qualities associated with each beam of the determined set of beams.

In one aspect, the means for determining the set of beams is configured to determine the set of beams based on a minimum allowable beam width. The apparatus 802/802' may further include means for determining whether to include, in the set of beams, beams corresponding to a second beam width or beams corresponding to a third beam width, the second beam width being narrower than the first beam width and the third beam width being wider than the first beam width. In one aspect, the means for determining whether to include, in the determined set of beams, the beams corresponding to the second beam width or the beams corresponding to the third beam width is configured to determine whether to include the beams corresponding to the second beam width or the beams corresponding to the third beam width based on a status of the apparatus 802/802'. In one aspect, the status of the apparatus 802/802' is at least partially based on a mobility of the apparatus 802/802'.

In one aspect, the first beam spatially contains beams corresponding to the second beam width. In one aspect, at least one beam corresponding to the third beam width spatially contains the first beam. In one aspect, the means for determining the set of beams based on the first beam width is configured to determine the set of beams further based on a status of the apparatus 802/802'. In one aspect, the first beam is a current serving beam on which the apparatus 802/802' communicates with a base station.

The apparatus 802/802' may further include means for switching the current serving beam from the first beam to a second beam that is included in the set of beam. In one aspect, the means for switching the current serving beam is configured to switch the current serving beam based on the respective measured channel qualities. In one aspect, the apparatus 802/802' may further include means for reporting the respective measured channel qualities to a base station when the apparatus 802/802' is configured for measurement reporting.

The aforementioned means may be one or more of the aforementioned components of the apparatus 802 and/or the processing system 914 of the apparatus 802' configured to perform the functions recited by the aforementioned means. As described supra, the processing system 914 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

The following examples are given by way of illustration. The following examples and aspects of the examples may be combined with embodiments or aspects discussed elsewhere in the present disclosure. In view of the foregoing disclosure, a method, a computer-readable medium, and an apparatus have been provided. The apparatus may be implemented as a UE. In example one of the present disclosure, the apparatus is configured to: identify a first beam associated with a first beam width based on at least one reference signal received by the apparatus; determine a set of beams based on the first beam width that is associated with the identified first beam, the determined set of beams including at least one beam corresponding to the first beam width; and measure respective channel qualities associated with each beam of the determined set of beams.

Example two of the present disclosure may include the apparatus of example one, and the set of beams is based on a lowermost allowable beam width. Example three of the present disclosure may include the apparatus of any of examples one through two, and the apparatus is further configured to determine whether to include, in the set of beams, beams corresponding to a second beam width or beams corresponding to a third beam width, the second beam width being narrower than the first beam width and the third beam width being wider than the first beam width.

Example four of the present disclosure may include the apparatus of example three, and the determination of whether to include, in the determined set of beams, the beams corresponding to the second beam width or beams corresponding to the third beam width is based on a status of the apparatus. Example five of the present disclosure may include the apparatus of example four, and the status of the apparatus is at least partially based on a mobility of the apparatus.

Example six of the present disclosure may include the apparatus of any of examples three through five, and the first beam spatially contains beams corresponding to the second beam width. Example seven of the present disclosure may include the apparatus of any of examples three through six, and at least one beam corresponding to the third beam width spatially contains the first beam. Example eight of the present disclosure may include the apparatus of any of examples one through seven, and the determination of the set of beams based on the first beam width is further based on a status of the apparatus.

Example nine of the present disclosure may include the apparatus of any of examples one through eight, and the first beam is a current serving beam on which the apparatus communicates with a base station. Example ten of the present disclosure may include the apparatus of example nine, and the apparatus is further configured to switch the current serving beam from the first beam to a second beam that is included in the set of beams. Example eleven of the present disclosure may include the apparatus of example ten, and the switch of the current serving beam is based on the respective measured channel qualities. Example twelve of the present disclosure may include the apparatus of any of examples one through eleven, and the apparatus is further configured to report the respective measured channel qualities to a base station when configured for measurement reporting.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication by a user equipment (UE), comprising:
   identifying a first UE receive beam configured as a current serving receive beam that is actively used to communicate with a base station, the first UE receive beam having one or more child beams or one or more parent beams and the first UE receive beam having a first beam width;

determining, at the UE, a set of receive beams based on identifying the first UE receive beam configured as the current serving receive beam, wherein the set of receive beams comprises a subset of UE receive beams, wherein determining the set of receive beams comprises determining a set of receive beams that includes at least one of a child beam of the one or more child beams or a parent beam of the one or more parent beams, wherein the one or more child beams comprise a second beam width narrower than the first beam width and wherein the one or more parents beam comprise a third beam width wider than the first beam width; and measuring respective channel qualities associated with each beam of the determined set of receive beams.

2. The method of claim 1, wherein the determining the set of receive beams is based on a lowermost allowable beam width.

3. The method of claim 1, wherein determining the set of receive beams comprises determining a set of receive beams that includes at least one neighbor beam, wherein the at least one neighbor beam comprises a beam width corresponding to the first beam width.

4. The method of claim 1, further comprising determining whether to include, in the set of receive beams, the child beam of the one or more child beams or the parent beam of the one or more parent beams based on a status of the UE.

5. The method of claim 4, wherein the status of the UE is at least partially based on a mobility of the UE.

6. The method of claim 1, wherein identifying the first UE receive beam comprises identifying a beam identifier (ID) or index that corresponds to the first UE receive beam.

7. The method of claim 1, further comprising:
switching the current serving receive beam from the first UE receive beam to a second beam that is included in the set of beams.

8. The method of claim 7, wherein the switching the current serving receive beam is based on the respective measured channel qualities.

9. The method of claim 1, further comprising:
reporting the respective measured channel qualities to the base station when configured for measurement reporting.

10. An apparatus for wireless communication by a user equipment (UE), comprising:
means for identifying a first UE receive beam configured as a current serving receive beam that is actively used to communicate with a base station, the first UE receive beam having one or more child beams or one or more parent beams and the first UE receive beam having a first beam width;
means for determining, at the UE, a set of receive beams based on identifying the first UE receive beam configured as the current serving receive beam, wherein the set of receive beams comprises a subset of UE receive beams, wherein determining the set of receive beams comprises determining a set of receive beams that includes at least one of a child beam of the one or more child beams or a parent beam of the one or more parent beams, wherein the one or more child beams comprise a second beam width narrower than the first beam width and wherein the one or more parents beam comprise a third beam width wider than the first beam width; and
means for measuring respective channel qualities associated with each beam of the determined set of receive beams.

11. The apparatus of claim 10, wherein the means for determining the set of receive beams is configured to determine a set of receive beams that includes at least one neighbor beam, wherein the at least one neighbor beam comprises a beam width corresponding to the first beam width.

12. The apparatus of claim 10, wherein the means for identifying the first UE receive beam is configured to identify a beam identifier (ID) or index that corresponds to the first UE receive beam.

13. The apparatus of claim 10, further comprising:
means for switching the current serving receive beam from the first UE receive beam to a second beam that is included in the set of beam; and
means for switching the current serving receive beam is configured to switch based on the respective measured channel qualities.

14. An apparatus for wireless communication by a user equipment (UE), comprising:
a memory; and
at least one processor coupled to the memory and configured to:
identify a first UE receive beam configured as a current serving receive beam that is actively used to communicate with a base station, the first UE receive beam having one or more child beams or one or more parent beams and the first UE receive beam having a first beam width;
determine, at the UE, a set of receive beams based on identification of the first UE receive beam configured as the current serving receive beam, wherein the set of receive beams comprises a subset of UE receive beams, wherein determining the set of receive beams comprises determining a set of receive beams that includes at least one of a child beam of the one or more child beams or a parent beam of the one or more parent beams, wherein the one or more child beams comprise a second beam width narrower than the first beam width and wherein the one or more parents beam comprise a third beam width wider than the first beam width; and
measure respective channel qualities associated with each beam of the determined set of receive beams.

15. The apparatus of claim 14, wherein the at least one processor is configured to determine the set of receive beams based on a lowermost allowable beam width.

16. The apparatus of claim 14, wherein the at least one processor is configured to determine the set of receive beams by determining a set of receive beams that includes at least one neighbor beam, wherein the at least one neighbor beam comprises a beam width corresponding to the first beam width.

17. The apparatus of claim 14, wherein the at least one processor is further configured to determine whether to include, in the set of receive beams, the child beam of the one or more child beams or the parent beam of the one or more parent beams based on a status of the UE.

18. The apparatus of claim 17, wherein the status of the UE is at least partially based on a mobility of the UE.

19. The apparatus of claim 14, wherein the at least one processor is configured to identify the first UE receive beam by identifying a beam identifier (ID) or index that corresponds to the first UE receive beam.

20. The apparatus of claim 14, wherein the at least one processor is further configured to switch the current serving receive beam from the first UE receive beam to a second beam that is included in the set of beams.

21. The apparatus of claim 20, wherein the at least one processor is configured to switch the current serving receive beam based on the respective measured channel qualities.

22. The apparatus of claim 14, wherein the at least one processor is further configured to report the respective measured channel qualities to the base station when configured for measurement reporting.

23. A non-transitory, computer-readable medium storing computer-executable code for wireless communication by a user equipment (UE), the code when executed by a processor cause the processor to:
- identify a first UE receive beam configured as a current serving receive beam that is actively used to communicate with a base station, the first UE receive beam having one or more child beams or one or more parent beams and the first UE receive beam having a first beam width;
- determine, at the UE, a set of receive beams based on identification of the first UE receive beam configured as the current serving receive beam, wherein the set of receive beams comprises a subset of UE receive beams, wherein determining the set of receive beams comprises determining a set of receive beams that includes at least one of a child beam of the one or more child beams or a parent beam of the one or more parent beams, wherein the one or more child beams comprise a second beam width narrower than the first beam width and wherein the one or more parents beam comprise a third beam width wider than the first beam width; and
- measure respective channel qualities associated with each beam of the determined set of receive beams.

\* \* \* \* \*